Feb. 26, 1946.   J. TRAGER   2,395,593
DRUM CLEANING MACHINE
Filed Feb. 8, 1945   2 Sheets-Sheet 1
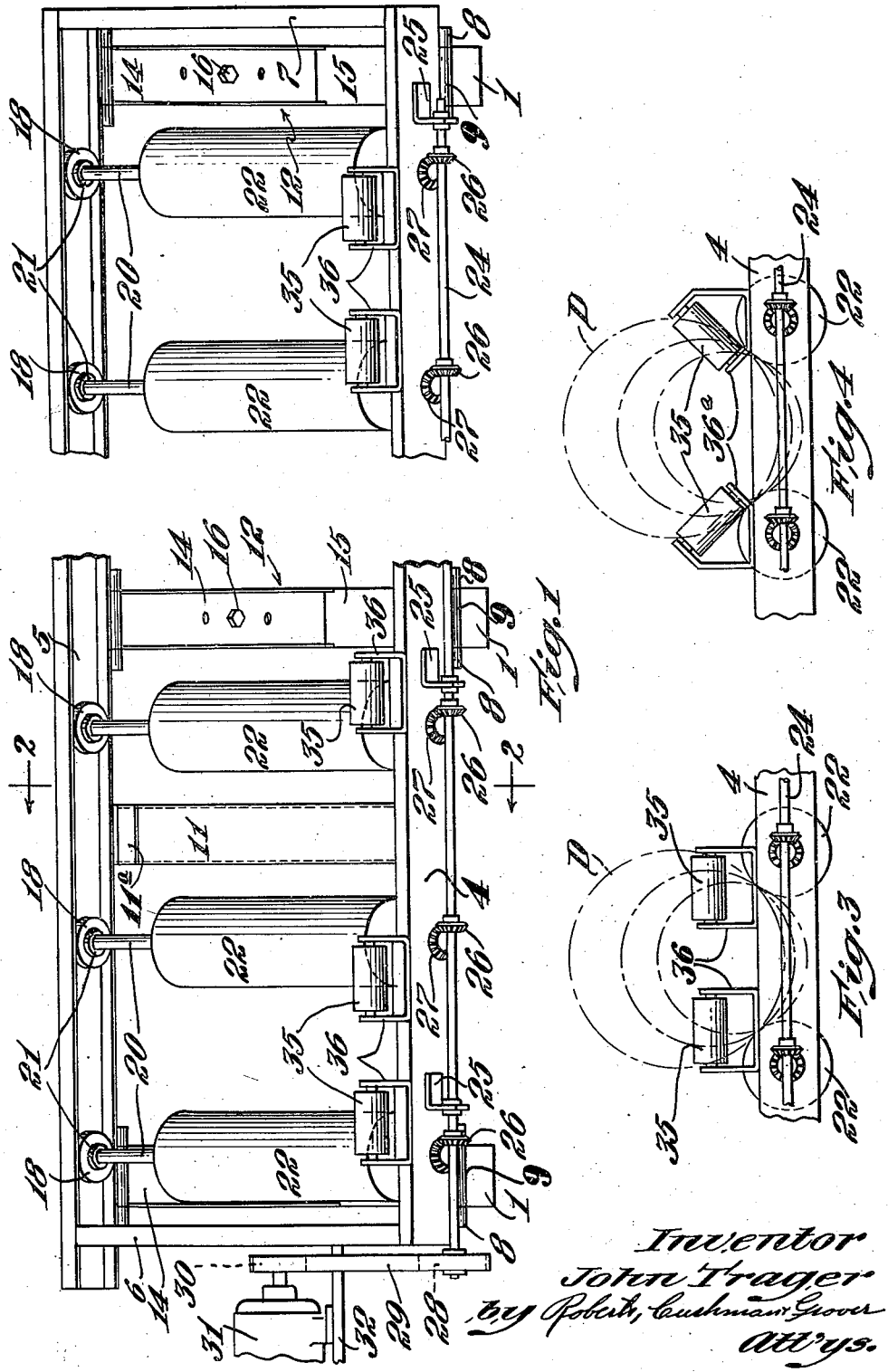

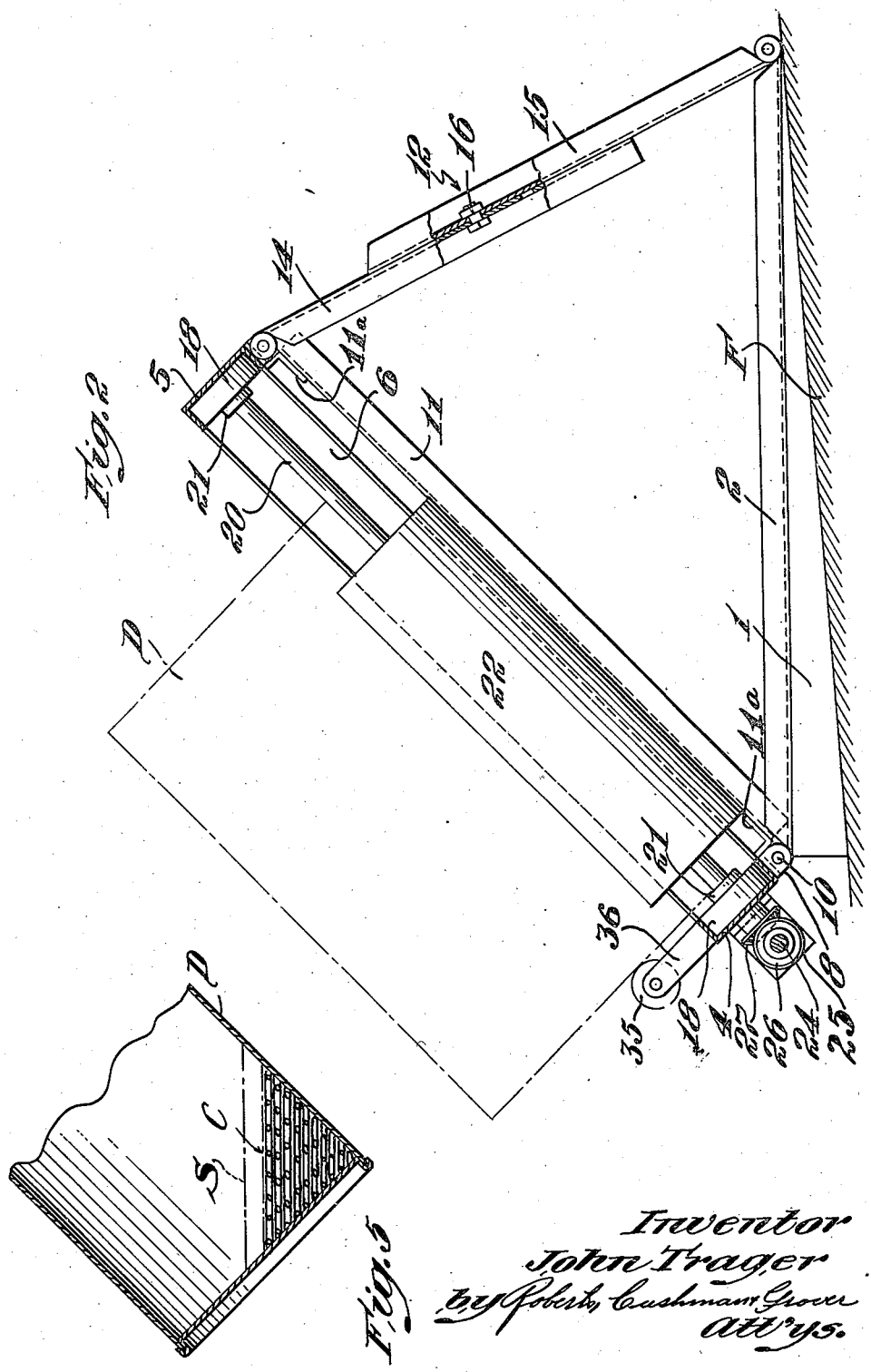

Patented Feb. 26, 1946

2,395,593

UNITED STATES PATENT OFFICE 2,395,593

DRUM CLEANING MACHINE

John Trager, Malden, Mass.

Application February 8, 1945, Serial No. 576,784

5 Claims. (Cl. 134—150)

This invention relates to a drum-cleaning machine, and its principal objects are to provide an efficient and reliable apparatus which is not only capable of scouring the side wall of a drum, but also the head and side portions, and to provide an apparatus which is capable of handling several drums of the same or different sizes at the same time and without requiring adjustment of parts, etc.

Further objects relate to various features of construction and will be apparent from consideration of the following description and the accompanying drawings, wherein:

Fig. 1 is a front elevation of an apparatus constructed in accordance with the present invention;

Fig. 2 is an enlarged section on the line 2—2 of Fig. 1;

Fig. 3 is a fragmentary bottom view of the apparatus;

Fig. 4 is a view similar to Fig. 3, but showing a modification; and

Fig. 5 is a longitudinal section through a drum when positioned on the apparatus and illustrating the manner in which its lower side wall and head portion are scoured.

The embodiment herein shown for the purpose of illustration comprises a base having spaced footings 1 shaped to fit on an inclined floor F so as to support in a substantially horizontal position base members 2 (Fig. 2) preferably formed of channel iron or the like structural elements. An elongate rectangular frame member, comprising lower and upper sides 4 and 5 and end members 6 and 7 (Fig. 1), is pivotally mounted, in any conventional manner, on the base members 2. The pivotal connections here shown are hinges of the hook and eye type, consisting of spaced pairs of depending eye members 8 which are welded or otherwise secured to the underside of frame member 4, upstanding eye members 9 which are welded or otherwise secured to the front ends of base members 2, and pintles 10 extending through the eyes of the members 8 and 9, as shown in Figs. 1 and 2.

One or more transverse reinforcing members 11, preferably of channel iron, extend between side members 4 and 5, the opposite ends of each reinforcing member 11 being welded or otherwise secured to short lengths of angle iron 11a which are welded or otherwise secured to members 4 and 5, as shown in Figs. 1 and 2.

The frame is supported in an inclined position by adjustable supports 12, the opposite ends of which are pivotally connected to the base members 2 and the upper frame member 5 by hinges of the type previously described. Each adjustable support 12 comprises a pair of channel irons 14 and 15 in face-to-face relation as shown in Fig. 2, each being formed with spaced openings for the reception of bolts 16 or the like removable elements. With this particular construction and arrangement the supports 12 may be extended or retracted so that the frame may be supported at any desired angle of inclination less than the order of 75°, although as here shown the preferred angle is of the order of 45° which is found to be optimum for the usual drum-cleaning operations.

The lower and upper sides 4 and 5 carry aligned bearings 18 arranged in pairs, as shown in Figs. 1 and 2, and these bearings rotatably support transversely extending roller shafts 20, the lower ends of which project through openings formed in the lower side member 4. Collars 21 or the like elements fixed to the shafts 20 are provided to retain them against axial movement. The shafts 20 support drum-driving rollers 22 of a length and diameter such that each pair of rollers may support various sizes of drums D, preferably ranging from a 10 gallon size up to 55 gallon size or larger, as illustrated by the dot and dash lines of Figs. 2 and 3.

A single drive shaft 24, suitably journaled in brackets 25 fixed to the under face of the side member 4 so that the axis of the drive shaft 24 is in closely spaced parallel relation to the pivotal axis 10 of the frame, carries a plurality of bevelled gears 26 which mesh with bevelled gears 27 carried by the projecting ends of the shafts 20 and thus provides a drive for rotating the rollers 22 of each pair synchronously in the same direction. One end of the drive shaft 24 carries a pulley 28 (Fig. 1) connected through a belt 29 to a pulley 30 of a motor 31 which may be mounted on a bracket 32 suitably secured to the end member 6, it being understood that the motor 31 may be of the variable speed type, or conventional means may be provided for rotating the drum-driving rollers 22 at any desired speed. With the construction and arrangement herein shown the motor 31 rotates the drum-driving rollers at the desired speed and at any degree of inclination of the frame, and accordingly the apparatus is capable of operating on practically all commercial sizes of drums.

In order to maintain the drums D in place on the inclined rollers 22, a guide roll 35 is rotatably mounted either in a generally U-shaped bracket 36 (as shown in Fig. 3) or in a V-shaped bracket 36a (as shown in Fig. 4), the brackets being secured to the upper edge of the side member 4 so that the face of each guide roll 35 is adjacent to but spaced from the lower end of its associated drum-driving roller and its axis of rotation is in a plane approximately at right angles to the shaft 20, as shown in Figs. 3 and 4, both of which arrangements have been found to give satisfactory results.

In using the apparatus for cleaning the sides and/or heads of conventional drums D, the customary cleaning solution or solvent S may first be poured into the drum and a cleaning chain C (Fig. 5) or other mechanical abrasive element added. The drum is then positioned on one pair of drum-driving rollers with the lower edge engaging the guide rolls, as indicated by the dot and dash lines of Figs. 2 to 4, and the apparatus may then be started, thereby rotating the drums at such speed that the chain and cleaning solution, cascade or slide down the side wall and end of the drum (as illustrated in Fig. 5), subjecting these parts to the abrading action of the chain and cleansing action of the solution.

It will be noted that the angle of inclination and the volume of cleaning solution and chain govern the extent or area which is subjected to the scouring action, and hence by varying the angle of inclination and amount of chain or scouring agent in accordance with the size of the drum, the nature and location of the material to be removed from its interior, an efficient scouring may be obtained. Moreover, with the apparatus herein shown the same or different size drums may be cleaned on the different pairs of drum-driving rollers, and a group or stack of two or three small sized drums, for example, 10, 15, and 30 gallon drums, may be applied to the same pair of drum-driving rollers and scoured at the same time.

While I have shown and described one desirable embodiment of the invention, it is to be understood that this disclosure is for the purpose of illustration and various changes and modifications may be made without departing from the spirit and scope of the invention as set forth in the appended claims.

I claim:

1. A drum-cleaning machine comprising a frame member adapted to be supported at an inclined angle relative to the horizontal, a pair of spaced drum-driving rollers having their end portions rotatably mounted on opposite sides of the frame so as rotatably to support a drum, driving means for rotating at least one of said drum-driving rollers, and a guide roll mounted adjacent to the lower end of each drum-driving roller with its axis in the plane which is at approximately right angles to the axis of the adjacent drum driving roller so as to engage the lower end of a drum supported thereon.

2. A drum-cleaning machine comprising an elongate frame member supported at an inclined angle relative to the horizontal, a plurality of shafts rotatably mounted in the opposite elongate sides of said frame member and arranged in spaced pairs, a drum-driving roller secured to each shaft with its ends spaced from the elongate sides of said frame so as rotatably to support a drum, driving means for rotating at least one shaft of each pair, and a guide roll mounted adjacent to the lower end of each drum-driving roller with its axis in the plane which is at approximately right angles to the axis of the adjacent drum driving roller so as to engage the lower end of a drum supported thereon.

3. A drum-cleaning machine comprising a base, a frame member pivotally supported at its lower side to said base, means connected with said frame for adjustably supporting it at an inclined angle relative to the horizontal, a pair of shafts rotatably mounted in the opposite sides of the frame, drum-driving rollers secured to said shafts so as to rotatably support a drum, a drive shaft extending along said lower side of the frame member with its axis in closely spaced parallel relation to the pivotal axis of said frame, driving connections between said drive shaft and at least one of said roller shafts for rotating the drum driving roller carried thereby, a bracket secured to said lower side of the frame member adjacent to the end of each drum-driving roller, and a guide roll mounted in each bracket with its axis in the plane which is approximately at right angles to the axis of the adjacent drum-driving roller so as to engage the lower end of a drum supported thereon.

4. A drum-cleaning machine comprising a base, a frame member pivotally supported at its lower side to said base, means connected with said frame for adjustably supporting it at an inclined angle relative to the horizontal, a plurality of roller shafts rotatably mounted in the opposite sides of said frame and arranged in pairs, drum-driving rollers secured to said shafts with their ends spaced from said sides so that each pair may rotatably support a drum, a drive shaft extending along the lower side of said frame member, driving connections between said drive shaft and each of said roller shafts for rotating the drum-driving rollers synchronously in the same direction, brackets secured to said lower side of the frame member adjacent to the ends of the drum-driving rollers, and a guide roll mounted in each bracket with its axis in the plane which is approximately at right angles to the axis of the adjacent drum-driving roller so as to engage the lower end of a drum supported thereon.

5. A drum-cleaning machine comprising a frame member, means pivotally supporting said frame member so that it may be swung to an inclined position, a plurality of shafts having their end portions rotatably mounted at the opposite sides of said frame, drum-supporting members mounted on said shafts between their ends, driving means for rotating at least one of said shafts, and a rotatable member mounted adjacent to one end of each of said shafts with its axis of rotation in the plane which is at approximately right angles to the axis of the adjacent shaft, said rotatable member being engageable with the end of a drum supported by the adjacent drum-engaging members when said frame is in an inclined position.

JOHN TRAGER.